(12) United States Patent
Liu et al.

(10) Patent No.: US 12,067,728 B2
(45) Date of Patent: Aug. 20, 2024

(54) HETEROGENEOUS IMAGE REGISTRATION METHOD AND SYSTEM

(71) Applicant: Shanghai Jiaotong University, Shanghai (CN)

(72) Inventors: Yadong Liu, Shanghai (CN); Yingjie Yan, Shanghai (CN); Qian Jiang, Shanghai (CN); Ling Pei, Shanghai (CN); Zhe Li, Shanghai (CN); Peng Xu, Shanghai (CN); Lei Su, Shanghai (CN); Xiaofei Fu, Shanghai (CN); Xiuchen Jiang, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 284 days.

(21) Appl. No.: 17/598,310

(22) PCT Filed: Jun. 8, 2020

(86) PCT No.: PCT/CN2020/094892
§ 371 (c)(1),
(2) Date: Sep. 27, 2021

(87) PCT Pub. No.: WO2021/248270
PCT Pub. Date: Dec. 16, 2021

(65) Prior Publication Data
US 2022/0319011 A1     Oct. 6, 2022

(51) Int. Cl.
*G06T 3/14*     (2024.01)
*G06T 7/13*     (2017.01)
*G06T 7/149*    (2017.01)

(52) U.S. Cl.
CPC ............. *G06T 7/13* (2017.01); *G06T 3/14* (2024.01); *G06T 7/149* (2017.01)

(58) Field of Classification Search
CPC ......... G06T 7/13; G06T 3/0068; G06T 7/149; G06T 7/33; G06T 2207/10048;
(Continued)

(56) References Cited

U.S. PATENT DOCUMENTS

2010/0310181 A1* 12/2010 Djeziri ............... G06T 7/33
                                                     382/209
2020/0349687 A1* 11/2020 Weng ................. B64C 39/024

FOREIGN PATENT DOCUMENTS

CN    102800097 A    11/2012
CN    104318548 A     1/2015
(Continued)

OTHER PUBLICATIONS

Q. Jiang et al., "A Contour Angle Orientation for Power Equipment Infrared and Visible Image Registration," in IEEE Transactions on Power Delivery, vol. 36, No. 4, pp. 2559-2569, Aug. 2021, doi: 10.1109/TPWRD.2020.3011962. (Year: 2020).*

(Continued)

*Primary Examiner* — Ian L Lemieux
*Assistant Examiner* — Woo C Rhim
(74) *Attorney, Agent, or Firm* — IDEA Intellectual Limited; Margaret A. Burke; Sam T. Yip

(57) ABSTRACT

A heterogeneous image registration method includes: performing edge detection on collected images, in combination with a curvature scale space strategy to extract contour curved segments in an edge image. Implementing a feature point detection strategy based on global and local curvature detecting feature points in the contour curved segments, and obtaining the nearest minimum local curvature of the feature points pointing to starting and end points of the contour, respectively. Calculating the number of neighborhood sampling points and neighborhood auxiliary feature points of neighborhoods on both edges of each of the feature points (Continued)

according to the nearest minimum local curvature. Using neighborhood auxiliary feature points and feature points to form a feature triangle, calculating an angle bisector vector and a main direction corresponding to the feature point in the feature triangle. The present invention is remarkable, accurate, and has high adaptability to the image registration scene of electric equipment.

8 Claims, 3 Drawing Sheets

(58) Field of Classification Search
CPC ........... G06T 2207/10004; G06T 7/337; G06T 7/136; G06T 7/0004; G06T 2207/30108; G06T 7/74; G06V 10/44; G06V 10/42; G06V 10/752; G06V 10/751; G06V 10/755
See application file for complete search history.

(56) References Cited

FOREIGN PATENT DOCUMENTS

| | | | | | |
|---|---|---|---|---|---|
| CN | 104978709 | A | | 10/2015 | |
| CN | 105930858 | A | * | 9/2016 | ........... G06K 9/6202 |
| CN | 106257535 | A | * | 12/2016 | ........... G06K 9/4604 |
| CN | 107169947 | A | * | 9/2017 | ............... G06T 5/50 |
| CN | 107507208 | A | * | 12/2017 | ............... G06T 7/13 |
| CN | 107977924 | A | * | 5/2018 | ........... G06T 3/0068 |
| CN | 108254077 | A | * | 7/2018 | ............ G01J 5/0066 |
| CN | 109409292 | A | * | 3/2019 | ........... G06K 9/0063 |
| CN | 111145228 | A | * | 5/2020 | ............... G06T 7/13 |
| CN | 111223133 | A | * | 6/2020 | ........... G06K 9/4671 |

OTHER PUBLICATIONS

Du, Qinglei et al.; Infrared and Visible Image Registration Based on Scale-Invariant PIIFD Feature and Locality Preserving Matching; IEEE Access; vol. 6, 2018, p. 64107-64121.

* cited by examiner (a) SIFT  (b) PIIFD (c) SURF  (d) CAO

HETEROGENEOUS IMAGE REGISTRATION METHOD AND SYSTEM

CROSS-REFERENCES TO RELATED APPLICATIONS

This application is a 371 application of PCT application number PCT/CN2020/094892 filed Jun. 8, 2020, the disclosure of which is incorporated herein by reference in their entirety

FIELD OF THE INVENTION

The present invention relates to the technical field of image distribution, in particular to a method and system for registration of heterogeneous images.

BACKGROUND OF THE INVENTION

Since automated inspections reduce the demand for human resources for high-voltage equipment inspections in the power grid, and can improve inspection efficiency, automated inspection technology based on inspection robots and drones has become an important part of the intelligent diagnosis system for power grid equipment. Inspection robots and drones are equipped with infrared and visible light binocular cameras, which are responsible for photographing the operating status of power equipment under working conditions, and upload the image data to the database of the maintenance unit for status monitoring and fault diagnosis. These automatic inspection equipment mainly uses multi-mode imaging sensor and image processing technology to work, so it is very important to develop efficient and reliable image processing technology for the construction of diagnosis system, such as image recognition, fusion and distribution technology. Among them, image distribution technology is the prelude to the application of many image technologies, especially image stitching, fusion and target detection. The purpose of image distribution is to align multiple images of the same scene taken by different sensors, different moments, and different perspectives. The visible light image can capture the shape information of the power equipment, while the infrared image can capture the heat radiation information of the power equipment. Therefore, the infrared and visible image distribution and recognition technology for power equipment can present a variety of information about the power equipment in one image, which greatly facilitates the fault detection of the power equipment.

However, realizing the precise distribution of infrared and visible light images of power equipment is currently a very challenging task, and it is difficult for existing algorithms to achieve precise alignment. Because the resolution, spectrum, and viewing angle of infrared and visible light images are significantly different.

SUMMARY OF THE INVENTION

This section is for the purpose of summarizing some aspects of embodiments of the invention and to briefly introduce some preferred embodiments. In this section, as well as in the abstract and the title of the invention of this application, simplifications or omissions may be made to avoid obscuring the purpose of the section, the abstract and the title, and such simplifications or omissions are not intended to limit the scope of the invention.

In view of the above-mentioned existing problems, the present invention is proposed.

Therefore, the present invention provides a heterogeneous image registration method and system, which can solve the problem of accurate provision of infrared and visible light images of power equipment.

In order to solve the above technical problems, the present invention provides the following technical solutions which including using a Canny edge detection operator to perform edge detection on collected images, in combination with a curvature scale space strategy to extract contour curved segments in an edge image; implementing a feature point detection strategy based on global and local curvature detecting feature points in the contour curved segments, and obtaining the nearest minimum local curvature of the feature points pointing to the starting and end points of the contour, respectively; calculating the number of neighborhood sampling points and neighborhood auxiliary feature points of neighborhoods on both edges of each of the feature points according to the nearest minimum local curvature; using the neighborhood auxiliary feature points and the feature points to form a feature triangle, and calculating an angle bisector vector and a main direction corresponding to the feature point in the feature triangle; wherein the main direction points to a concave edge of the contour of the feature points to complete the main direction distribution.

As a preferred solution of the heterogeneous image registration method of the present invention, the detection of the feature points including using the Canny edge detection operator to detect an edge binary image of the collected images, and extracting the contour curved segments in the edge image; calculating curvature of each point in the contour curved segments, using a maximum curvature point on the contour as a candidate feature point, storing and detecting the nearest local minimum point at both ends of each maximum point; calculating an average curvature value of each candidate feature point in the neighborhoods of the contour curved segments; setting a curvature multiple threshold, such that when the curvature of the candidate feature point is less than a product of the average curvature value multiplied by the curvature multiple threshold, the candidate feature point is eliminated; when the curvature of the candidate feature point is greater than the product of multiplying the average curvature value by the threshold value, calculating whether the candidate feature point is on a circular contour; if so, the candidate feature point is rejected; otherwise, the candidate feature point is retained; calculating a positional relationship of the retained candidate feature point; if an angle between one of the feature points and two neighborhood feature points on the same contour is less than the curvature multiple threshold, defining the candidate feature point as the feature point; otherwise, the candidate feature point is eliminated; a first point and a last point of each unclosed contour being used as the feature points, and ending the extracting the feature points.

As a preferred solution of the heterogeneous image registration method of the present invention, the local minimum curvature point is defined comprising respectively detecting the local minimum curvature point in the contour curved segments that is the nearest to the feature point and points to the starting point and the end point of the contour; traversing from the first point to the last point of each contour; if the curvature of the feature points is less than the curvature of the two neighborhood feature points disposed on left and right sides of said feature point, the local minimum curvature point is defined; the feature point and both the two neighborhood feature points local minimum curvature disposed on the left and right sides of said feature point being respectively denoted as $P_f^j$, $P_{kL}^j$ and $P_{kR}^j$.

As a preferred solution of the heterogeneous image registration method of the present invention, calculating number of sampling points in the neighborhoods includes, $$\lambda_L = f - kL$$

$$\lambda_R = k_R - f$$

wherein $f \in [2, n]$, n: the number of feature points including in each contour, $\lambda_L$ and $\lambda_R$ are the number of neighborhood sampling points of the feature point, respectively.

As a preferred solution of the heterogeneous image registration method of the present invention, the neighborhood auxiliary feature points include: Gaussian weighting abscissa and ordinate of all points between the $kL^{th}$ point and the $f^{th}$ point in the $j^{th}$ contour according to the followings:

$$P_{fL}^j = (x_{fL}^j, y_{fL}^j)$$
$$= G_{\sigma = min(\lambda_L, f)} \cdot [P_{f-min(\lambda_L-1, f-1)}^j; \ldots; P_{f-1}^j; P_f^j]$$

$$P_{fR}^j = (x_{fR}^j, y_{fR}^j)$$
$$= G_{\sigma = min(\lambda_R n - f + 1)} \cdot [P_{f+min(\lambda_R+1, n-f)}^j; \ldots; P_{f+1}^j; P_f^j]$$

$$G\sigma = \left[e^{-x^2/2\sigma^2}|_{x=0,1,2,\ldots,\sigma-1}\right] / \left(\sum_{x=0}^{\sigma-1} e^{-x^2/2\sigma^2}\right)$$

wherein $G_\sigma$: one-dimensional Gaussian kernel; $P_{kL}^j$ and $P_{kR}^j$: auxiliary feature points of the neighborhoods; when $f=1$ or n, the one-dimensional Gaussian kernel is calculated as follows, $$\begin{cases} f = 1 \\ P_{fL}^j = P_1^j \\ P_{fR}^j = (x_{fR}^j, y_{fR}^j) \\ \quad = G_{\sigma = min(\lambda_R, n)} \cdot [P_{min(\lambda_R, n)}^j; \ldots; P_2^j; P_1^j] \end{cases}$$

$$\begin{cases} f = n \\ P_{fR}^j = P_n^j \\ P_{fL}^j = (x_{fL}^j, y_{fL}^j) \\ \quad = G_{\sigma = min(\lambda_L, n)} \cdot [P_{n-min(\lambda_L, n-1)}^j; \ldots; P_{n-1}^j; P_n^j] \end{cases}$$

As a preferred solution of the heterogeneous image registration method of the present invention, the said calculating the angle bisector vector comprises, $$v_{fL}^j = (x_{fL}^j - x_f^j, y_{fL}^j - y_f^j)$$

$$v_{fR}^j = (x_{fR}^j - x_f^j, y_{fR}^j - y_f^j)$$

$$v_{fm}^j = (x_{fm}^j, y_{fm}^j)$$

$$= min(\|v_{fL}^j\|_2, \|v_{fR}^j\|_2) \left(\frac{v_{fL}^j}{\|v_{fL}^j\|_2} + \frac{v_{fR}^j}{\|v_{fR}^j\|_2}\right)$$

wherein $P_f^j = (x_f^j, y_f^j)$; $V_{fL}^j$ and $V_{fR}^j$ are the coordinates of the feature point $P_f^j$, respectively; $V_{fm}^j$: the angle bisector vector.

As a preferred solution of the heterogeneous image registration method of the present invention, said calculating the main direction comprises, $$\phi(P_f^j) = \begin{cases} \tan^{-1}(y_{fm}^j / x_{fm}^j), & y_{fm}^j \geq 0 \cap x_{fm}^j \geq 0 \\ \tan^{-1}(y_{fm}^j / x_{fm}^j) + \pi, & x_{fm}^j < 0 \\ \tan^{-1}(y_{fm}^j / x_{fm}^j) + 2\pi, & y_{fm}^j < 0 \cap x_{fm}^j > 0 \end{cases}$$

wherein $\phi(P_f^j)$: the direction of the contour angle of feature point $P_f^j$, which is the main direction of the feature point in the main direction distribution.

As a preferred solution of the heterogeneous image registration method of the present invention, the extracting of the contour curved segments comprises: Gaussian filtering on grayscale images to obtain filtered images; calculating gradient matrix and direction matrix in the filtered images; performing non-maximum value suppression on the gradient matrix to obtain non-maximum value suppressed images; using dual-threshold strategy to detect and connect the edge contours of the non-maximum value suppressed images to obtain edge images.

As a preferred solution of the heterogeneous image registration method of the present invention, wherein: extracting the contour curve segment including, starting from the first row and the first column of the edge image, iteratively traverses and searches in line units; if a point is found as an edge point, it is marked as the first contour point and set to 0; finding out whether there is the edge point in the neighborhood where the side length of the contour point is 1, and if so, add it to the contour neighborhood as the second contour point, and set it to 0; repeating the search until there is no edge point in the neighborhood of a certain point, and define the stopping point as the last point of the contour; each contour is a set of the edge points, and all the acquired contours are integrated to form a set of contours, as follows, $$S = \{\Gamma^j | \Gamma^j = \{P_1^j, P_2^j, \ldots P_n^j\}\}_{j=1}^{N_s}$$

wherein contour $\Gamma^j$: $j^{th}$ contour curved segment in set S; n: number of pixels contained in the contour $\Gamma^j$; $N_s$: the total number of contour curved segments in the set S.

As a preferred solution of the heterogeneous image registration system of the present invention, an information acquisition module (100) collecting image data information and obtaining characteristic information; a data processing center module (200) receiving, calculating, storing, and outputting data information to be processed, the data processing center module comprising a calculation unit (201), a database (202) and an input and output management unit (203), the calculation unit (201) being connected to the information acquisition module (100), for receiving the data information acquired by the information acquisition module (100) to perform arithmetic processing, and calculating a local minimum curvature, number of sampling points in neighborhoods, auxiliary feature points in the neighborhoods, an angle bisector vector and main direction, the database (202) being connected to each of the modules, and being used to store all received data information and provide deployment and supply services for the data processing center module (200); the input and output management unit (203) receiving information of each of the modules and outputting calculation result of the calculation unit (201); a distribution module (300) being connected to the data processing center module (200), reading the calculation result of the calculation unit (201), controlling the main direction of the feature point to point to a concave edge of the feature point contour, and completing the main direction distribution to achieve precise matching.

The beneficial effects of the present invention: the method of the present invention performs the main direction calculation through the contour features between the images. On the one hand, in view of the large differences in the resolution, spectrum, and viewing angle of infrared and visible images, it is impossible to achieve the registration problem when these three scenes coexist. Each feature point is assigned a unique directional parameter to perform accurate description calculations. The extracted feature points are significant and accurate in matching. On the other hand, since the infrared and visible light images of the power equipment have extremely significant contour characteristics, the method of the present invention has higher adaptability to the image registration scene of the power equipment.

BRIEF DESCRIPTION OF THE DRAWINGS

In order to explain the technical solutions of the embodiments of the present invention more clearly, the following will briefly introduce the drawings used in the description of the embodiments. Obviously, the drawings in the following description are only some embodiments of the present invention. For those of ordinary skill in the art, other drawings can be obtained from these drawings without creative labor. Wherein.

DETAILED DESCRIPTION

Figure 1:
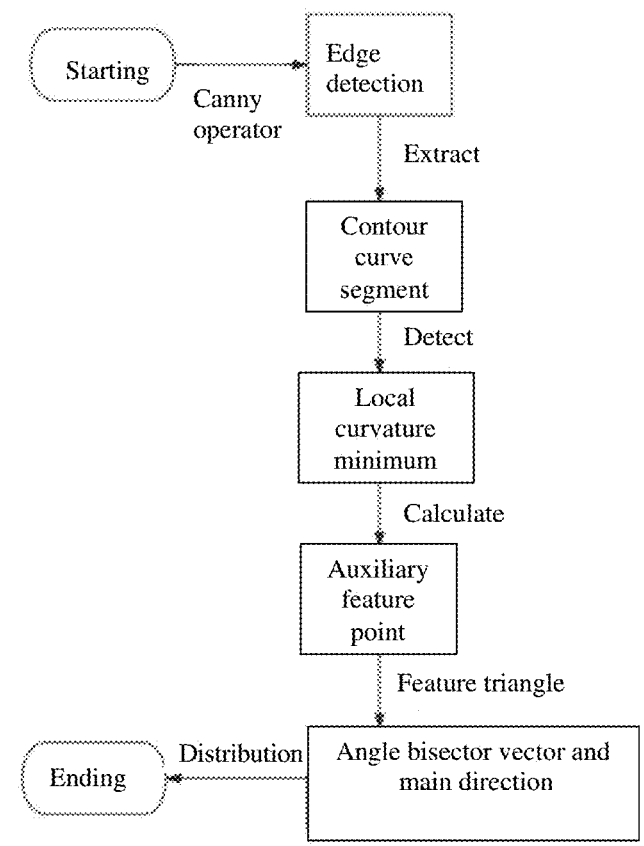
FIG. 1 is a schematic flowchart of a method for registration of heterogeneous images according to the first embodiment of the present invention.

In order to make the above objectives, features, and advantages of the present invention more obvious and understandable, the specific embodiments of the present invention will be described in detail below in conjunction with the accompanying drawings of the specification. Obviously, the described embodiments are part of the embodiments of the present invention, but not all of the embodiments. Based on the embodiments of the present invention, all other embodiments obtained by those of ordinary skill in the art without creative work should fall within the protection scope of the present invention.

In the following description, many specific details are explained in order to fully understand the present invention, but the present invention can also be implemented in other ways different from those described here. Those skilled in the art can make similar promotion without violating the connotation of the present invention. Therefore, the present invention is not limited by the specific embodiments disclosed below.

Secondly, the "one embodiment" or "embodiment" referred to herein refers to a specific feature, structure, or characteristic that can be included in at least one implementation of the present invention. The appearances of "in one embodiment" in different places in this specification do not all refer to the same embodiment, nor are they separate or selectively mutually exclusive embodiments with other embodiments.

The present invention will be described in detail in conjunction with schematic diagrams. When the embodiments of the present invention are described in detail, for ease of description, the cross-sectional view showing the device structure will not be partially enlarged according to the general scale. Moreover, the schematic diagram is only an example, which should not limit the scope of protection of the present invention here. In addition, the three-dimensional dimensions of length, width and depth should be included in the actual production.

At the same time, in the description of the present invention, it should be noted that the orientation or positional relationship indicated by "up, down, inside, and outside" in the terms is based on the orientation or positional relationship shown in the drawings. It is only for the convenience of describing the present invention and simplifying the description, rather than indicating or implying that the device or element referred to must have a specific orientation, be constructed and operated in a specific orientation, and therefore cannot be understood as a limitation of the present invention. In addition, the terms "first, second, or third" are only used for descriptive purposes, and cannot be understood as indicating or implying relative importance.

Unless otherwise clearly specified and limited in the present invention, the term "installation, connection, conjunction" should be understood in a broad sense, for example: it can be a fixed connection, a detachable connection or an integral connection; it can also be a mechanical connection, an electrical connection or a direct connection. The connection can also be indirectly connected through an intermediate medium, or it can be the internal communication between two components. For those of ordinary skill in the art, the specific meanings of the above-mentioned terms in the present invention can be understood in specific situations.

Example 1

The distribution method based on feature points is very adaptable to image perspective changes and image registration scenes shot at different times, so it is widely used and researched. However, the method based on feature points still has obvious problems in the registration of infrared and visible light images. For example, the resolution, spectrum and viewing angle of infrared and visible light images are quite different. The existing point feature-based methods cannot achieve these three scenes. The main problem of coexistence registration is that it is not accurate enough to describe the feature points.

FIGS. 1 to 7 are the first embodiment of the present invention. This embodiment provides a heterogeneous image registration method including, S1: Using a Canny edge detection operator to perform edge detection on collected images, in combination with a curvature scale space strategy to extract contour curved segments in an edge image. It should be noted that the edge detection of the image including:

Gaussian filtering on grayscale images to obtain filtered images;

calculate the gradient matrix and direction matrix in the filtered images. Use $S_x$ and $S_y$ to convolve the image with the image, respectively, to obtain two identical image matrices $G_x$ and $G_y$. And calculate the sum of squares (the gradient) and the value of the positive and negative tangent function (direction) at the same position of the matrix to obtain the gradient matrix and the direction matrix respectively, as follows:

$$S_x = \begin{bmatrix} -1 & 0 & 1 \\ -2 & 0 & 2 \\ -1 & 0 & 1 \end{bmatrix} S_Y = \begin{bmatrix} 1 & 2 & 1 \\ 0 & 0 & 0 \\ -1 & -2 & -1 \end{bmatrix}$$

$$G = \sqrt{G_x^2 + G_Y^2}$$

$$\theta = \arctan(G_Y/G_x)$$

performing non-maximum value suppression on the gradient matrix and find the maximum value in the gradient matrix (if the gradient of a point is greater than the gradient of all points in the square neighborhood with the side length of 3, it is the maximum value) and obtain non-maximum suppression images;

use dual-threshold strategy to detect and connect image edge contours, and set two thresholds th1 and th2 for non-maximum suppression images, the relationship between the two is th1=0.4th2. Set the gray value of the pixel whose gradient value is less than th1 to 0 to obtain image 1, and set the gray value of the pixel whose gradient value is less than th2 to 0 to obtain image 2 (Because the threshold of image 2 is high, most of the noise is removed, but useful edge information is also lost. The threshold of image 1 is lower, and more information is retained. Based on image 2, image 1 is used as a supplement to connect the edges of the image.)

Specifically, includes:

scan image 2 and when it encounters a non-zero gray pixel p(x,y), trace the contour line starting with p(x,y) until the end point q(x,y) of the contour line.

Observe the adjacent area of point s(x,y) corresponding to the position of point q(x,y) in image 2 and image 1.

If there is a non-zero pixel s(x,y) in the adjacent area of the s(x,y) point, it will be merged into image 2 as the r(x,y) point.

Repeat the above steps until image 1 and image 2 can no longer be scanned.

After connecting the contour line containing P (x, y), mark the contour line as accessed.

Search for the next contour line repeatedly in turn, stop searching until no new contour line is found, and complete the edge detection of canny operator.

Figure 2:
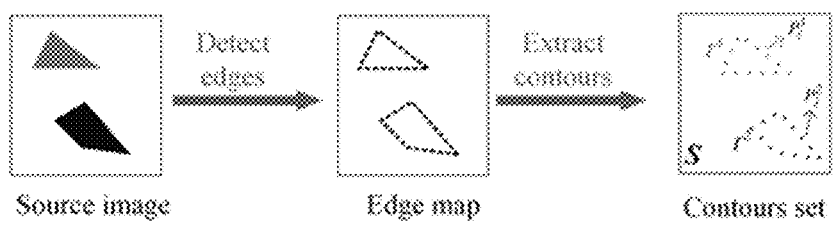
FIG. 2 is a schematic diagram of an image contour set extraction process of a heterogeneous image registration method according to the first embodiment of the present invention.
Figure 3:
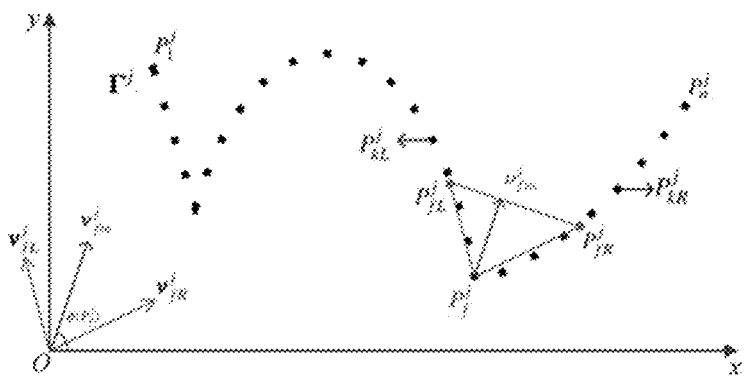
FIG. 3 is a schematic diagram of the CAO calculation of the main direction of the contour angle of a heterogeneous image registration method according to the first embodiment of the present invention.

Further, referring to FIG. 2, extracting contour curve segments include:

starting from a first row and a first column of the edge images, iteratively traversing and searching in line units.

If a point is found as an edge point, the point is marked as a first contour point, and is set to 0.

Determining whether there is the edge point in the region with an edge length of the contour point as 1, if so, adding the edge point to the contour region as a second contour point, and the second contour point is set to 0.

Repeat the search until there is no edge point in the neighborhood of a certain point, and define the stopping point as the last point of the contour.

Each contour being a set of the edge points, and all the contours being integrated to form a set of contours, as follows, $$S=\{\Gamma^j|\Gamma^j=\{P_1^j,P_2^j,\ldots P_n^j\}\}_{j=1}^{N_s}$$

wherein contour $\Gamma^j$: $j^{th}$ contour curved segment in set S; n: number of pixels contained in the contour $\Gamma^j$; $N_s$: the total number of contour curved segments in the set S.

S2: The feature point detection strategy based on global and local curvature detects feature points in the contour curve segment, and obtains the nearest local minimum curvature values of the feature points pointing to the starting and last points of the contour respectively. It should be noted in this step that the detection feature points include:

using the Canny edge detection operator to detect the edge binary image of the image, and extract the contour curve segment in the edge image.

Calculating curvature of each point in the contour curved segments, using a maximum curvature point on the contour as a candidate feature point, storing and detecting the local minimum point at both ends of each maximum point.

Calculating an average curvature value Kmean of each candidate feature point in the neighborhoods of the contour curved segments.

Setting a curvature multiple threshold C, such that when the curvature of the candidate feature point is less than a product of the average curvature value Kmean multiplied by the curvature multiple threshold C, the candidate feature point is eliminated.

When the curvature of the candidate feature point is greater than the product of multiplying the average curvature value Kmean by the threshold value C, calculating whether the candidate feature point is on a circular contour; if so, the candidate feature point is rejected; otherwise, the candidate feature point is retained.

Calculating a positional relationship of the retained candidate feature point; if an angle between one of the feature points and two neighborhood feature points on the same contour is less than the curvature multiple threshold θ, defining the candidate feature point as the feature point; otherwise, the candidate feature point is eliminated.

The first point and a last point of each unclosed contour being used as the feature points, and ending the extracting the feature points.

Further:

the local minimum curvature points $P_{kL}^j$ and $P_{kR}^j$ are defined comprising respectively detecting the local minimum curvature point in the contour curved segments that is the nearest to the feature point $P_k^j$ and points to the starting point and the end point of the contour.

Traversing from the first point to the last point of each contour; if the curvature of one of the feature points is less than the curvature of the the two neighborhood feature points disposed on left and right sides of said feature point, the local minimum curvature point is defined.

S3: Calculate the number of neighborhood sampling points and the neighborhood auxiliary feature points of the neighborhood on both sides of the feature point according to the local curvature minimum. It should also be noted that calculating number of sampling points in the neighborhoods includes:

$$\lambda_L = f - kL$$

$$\lambda_R = kR - f$$

wherein $f \in [2, n]$, n: the number of feature points including in each contour, $\lambda_L$ and $\lambda_R$ are the numbers of neighborhood sampling points of the feature point, respectively.

Specifically, the neighborhood auxiliary feature points include:

Gaussian weighting abscissa and ordinate of all points between the $kL^{th}$ point and the $f^{th}$ point in the $j^{th}$ contour according to the followings, $$P_{fL}^j = (x_{fL}^j, y_{fL}^j)$$
$$= G_{\sigma=min(\lambda_L,f)} \cdot [P_{f-min(\lambda_L-1,f-1)}^j; \ldots; P_{f-1}^j; P_f^j]$$

$$P_{fR}^j = (x_{fR}^j, y_{fR}^j)$$
$$= G_{\sigma=min(\lambda_R,n-f+1)} \cdot [P_{f+min(\lambda_R+1,n-f)}^j; \ldots; P_{f+1}^j; P_f^j]$$

$$G\sigma = \left[ e^{-x^2/2\sigma^2} \big|_{x=0,1,2,\ldots,\sigma-1} \right] / \left( \sum_{x=0}^{\sigma-1} e^{-x^2/2\sigma^2} \right)$$

wherein $G_\sigma$: one-dimensional Gaussian kernel, $P_{kL}^j$ and $P_{kR}^j$: auxiliary feature points of the neighborhood, when f=1 or n, the one-dimensional Gaussian kernel is calculated as follows, $$\begin{cases} f = 1 \\ P_{fL}^j = P_1^j \\ P_{fR}^j = (x_{fR}^j, y_{fR}^j) \\ \quad = G_{\sigma=min(\lambda_R,n)} \cdot [P_{min(\lambda_R,n)}^j; \ldots; P_2^j; P_1^j] \end{cases}$$

$$\begin{cases} f = n \\ P_{fR}^j = P_n^j \\ P_{fL}^j = (x_{fL}^j, y_{fL}^j) \\ \quad = G_{\sigma=min(\lambda_L,n)} \cdot [P_{n-min(\lambda_L,n-1)}^j; \ldots; P_{n-1}^j; P_n^j] \end{cases}$$

S4: The feature triangle is formed by the auxiliary feature points and feature points in the neighborhood, and the angle bisector vector and main direction corresponding to the feature points in the feature triangle are calculated. It should be noted in this step that, referring to FIG. 3, calculating the angle bisector vector includes:

$$v_{fL}^j = (x_{fL}^j - x_f^j, y_{fL}^j - y_f^j)$$

$$v_{fR}^j = (x_{fR}^j - x_f^j, y_{fR}^j - y_f^j)$$

$$v_{fm}^j = (x_{fm}^j, y_{fm}^j)$$

$$= \min(\|v_{fL}^j\|_2, \|v_{fR}^j\|_2) \left( \frac{v_{fL}^j}{\|v_{fL}^j\|_2} + \frac{v_{fR}^j}{\|v_{fR}^j\|_2} \right)$$

wherein $P_f^j = (x_f^j, y_f^j)$, $V_{fL}^j$ and $V_{fR}^j$ are the coordinates of the feature point $P_f^j$ respectively, $V_{fm}^j$: the angle bisector vector. Furthermore, the main direction of calculation includes:

$$\phi(P_f^j) = \begin{cases} \tan^{-1}(y_{fm}^j / x_{fm}^j), & y_{fm}^j \geq 0 \cap x_{fm}^j \geq 0 \\ \tan^{-1}(y_{fm}^j / x_{fm}^j) + \pi, & x_{fm}^j < 0 \\ \tan^{-1}(y_{fm}^j / x_{fm}^j) + 2\pi, & y_{fm}^j < 0 \cap x_{fm}^j > 0 \end{cases}$$

wherein $\phi(P_f^j)$: the direction of the contour angle of feature point $P_f^j$ is the main direction of the feature point in the distribution.

Preferably, what needs to be explained is:
each feature point and its neighboring auxiliary feature points form a feature triangle.

The feature triangles corresponding to the same feature point in the infrared and visible light images are similar triangles. At this time, the angle corresponding to the angle bisector vector is selected as the main direction to ensure that the main direction of the same feature point in different images is the same.

When the main directions are the same, the corresponding image registration strategy can successfully register images with different viewing angles.

S5: The main direction points to a concave edge of the contour of the feature points to complete the main direction distribution.

It is also necessary to note that the present embodiment illustrates with three existing registration methods in order to better understand the method of the present invention. (1.) The method based on infrared and visible light camera calibration parameters requires the priori parameters of the camera to be known, and it can only align a set of images taken by the camera at the same time, but cannot align images taken at different times and locations. Once calibrated, the registration error at different distances is constant, so this method is only suitable for limited scenes and cannot achieve image registration at different locations at different times. (2.) The region-based infrared and visible image registration method mainly uses some similarity measurement algorithms to determine the similarity of certain regions in the infrared and visible images to find the global optimal transformation parameters. This method is only suitable for situations where there is no obvious viewing angle difference between infrared and visible images and the overlap area between the images is relatively large, and its application scenarios are still limited. (3.) The feature-based registration method mainly processes some point, line and surface features in the image to register the image. However, the resolution, spectrum and viewing angle of infrared and visible light images are quite different. The existing feature-point-based methods cannot achieve registration when these three scenes coexist, and the feature points are not accurate enough to describe the feature points.

Generally speaking, the main direction assignment of feature points is one of the most important steps in feature point description. Its purpose is to assign unique directional parameters to each feature point, highlighting the image characteristics of that point, so that the extracted feature descriptors are significant. The existing main direction allocation SIFT, PIIFD, and SURF algorithms are all allocate the main direction based on the gradient features of the image. However, there are large spectral differences between infrared and visible images, and the extracted gradient features are not as relevant as those between homologous images. The method of the present invention mainly relies on the contour features between the images for main direction calculation. Since the infrared and visible light images of the power equipment have extremely prominent contour features, the method of the present invention is highly adaptable to the image registration scene of the power equipment.

Figure 4:
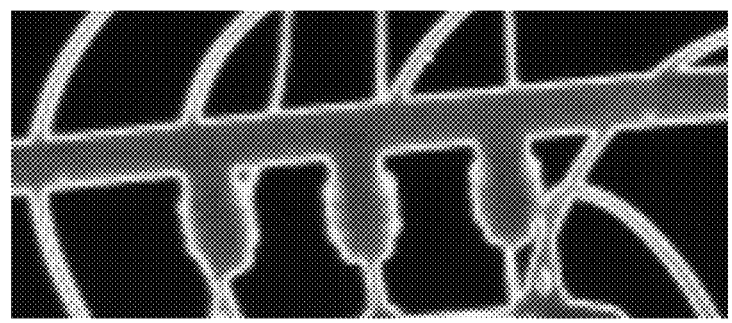
FIG. 4 is an infrared schematic diagram of a power device of a heterogeneous image registration method according to the first embodiment of the present invention.
Figure 5:
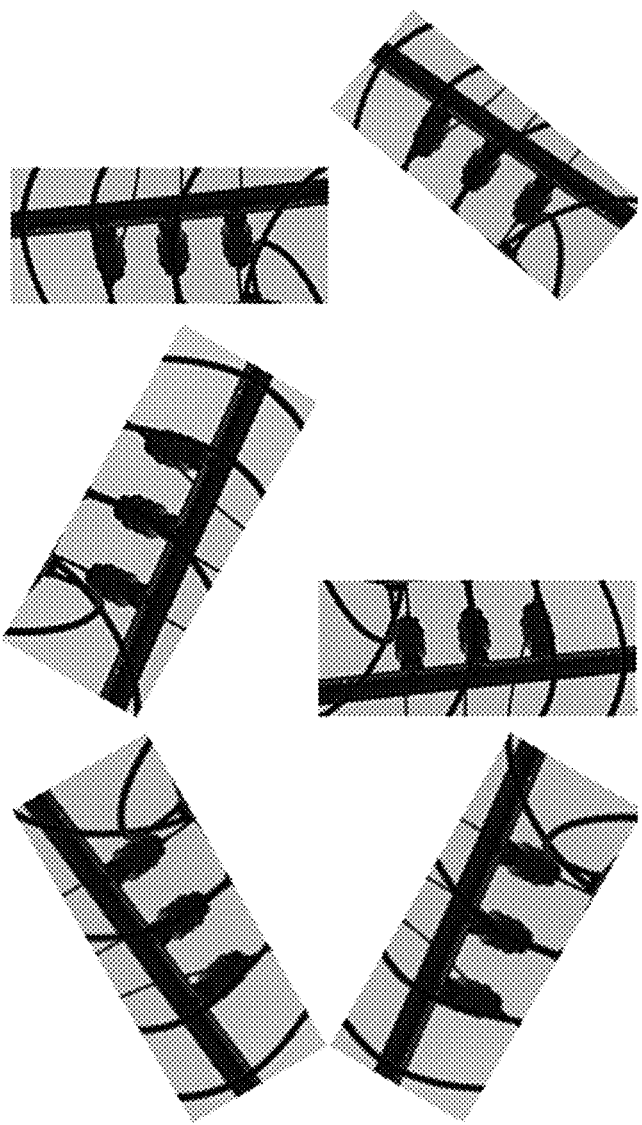
FIG. 5 is a visible light schematic diagram of a power device of a heterogeneous image registration method according to the first embodiment of the present invention.

Preferably, referring to FIGS. 4 and 5, in order to verify and explain the technical effects adopted in the method of the present invention. In this embodiment, the traditional SIFT method, PIIFD method, SURF method and the method of the present invention are selected for comparative testing. Comparing the test results by means of scientific argumentation to verify the true effect of the method of the present invention. The traditional SIFT method, PIIFD method, and SURF method do not have high accuracy and strong adaptability for the main direction distribution. In order to verify the higher accuracy of the method of the invention compared with the traditional method, in this embodiment, the traditional method and the method of the invention will be used to compare and test the distribution of one infrared image and six visible images of the same power equipment respectively.

Test conditions: (1) Use one infrared image (resolution 120×280) and six visible light images of the same electrical equipment as contrast images.

(2) The rotation angles of the six visible light images relative to the viewing angle of the infrared image are 0° (resolution 120×280), 60° (resolution 252×203), 120° (resolution 252×203), 180° (resolution 120×280), 240° (resolution 252×203), 300° (resolution 252×203).

(3) Turn on the automated test equipment and use the MATLB simulation to run the output result curve.

Figure 6:
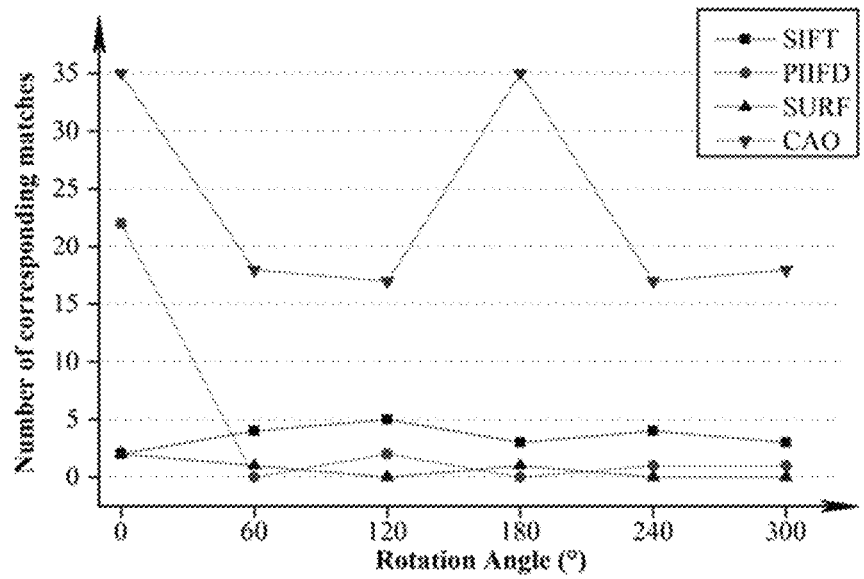
FIG. 6 is a schematic diagram of the quantitative comparison result of the main direction experiment of a heterogeneous image registration method according to the first embodiment of the present invention.
Figure 7:
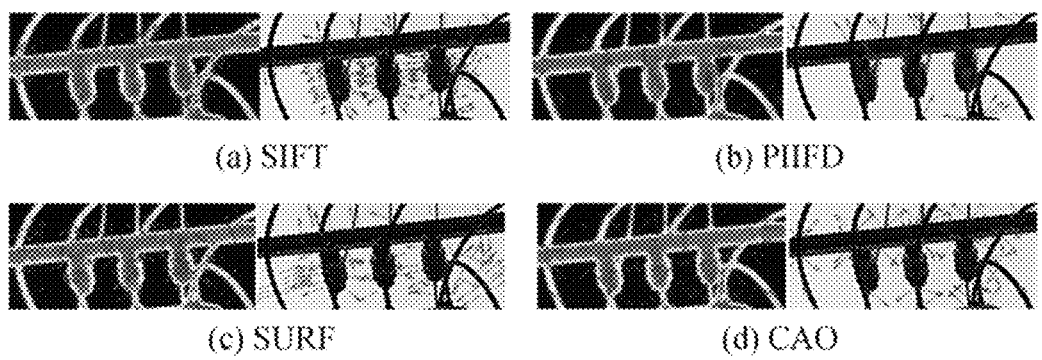
FIG. 7 is a schematic diagram of image comparison results when the rotation angle of a heterogeneous image registration method according to the first embodiment of the present invention is 0.

Referring to FIG. 6, the comparison curve of the main direction distribution test results between the traditional method and the method of the present invention (i.e. CAO) is shown. In the rotation angle of 0° to 300°, the curve output by the method of the invention is much higher than the number of feature points allocated by the three traditional methods. Referring to FIG. 7, it is a schematic diagram of the image comparison result when the rotation angle is 0°. It can be seen intuitively that the method of the present invention shows the most correct points under different rotation angles, and the correct points obtained by the method of the present invention are three times that of the traditional method. According to the image results, the main directions of the feature points of the method of the present invention all point to the concave side of the contour, which verifies that the method of the present invention has high accuracy and adaptability.

Example 2

Figure 8:
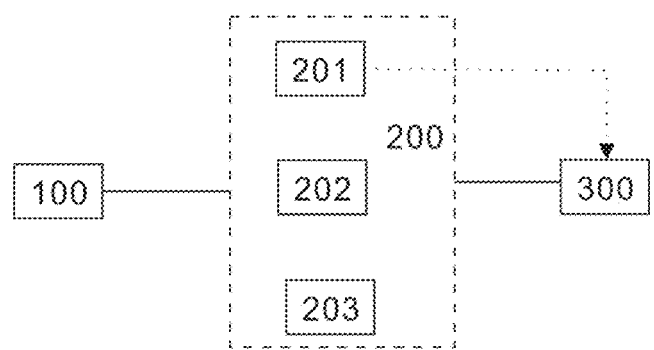
FIG. 8 is a schematic diagram of the module structure distribution of a heterogeneous image registration system according to the second embodiment of the present invention.

Referring to FIG. 8, it is a second embodiment of the present invention. This embodiment is different from the first embodiment in that it provides a heterogeneous image registration system which includes:
the information acquisition module 100 is used to collect the image data information and obtain characteristic information; data acquisition is a bridge connecting the computer and the external physical world, which is composed of sensors and controllers.

A data processing center module (200) receiving, calculating, storing, and outputting data information to be processed, the data processing center module comprising a calculation unit (201), a database (202) and an input and output management unit (203), the calculation unit (201) being connected to the information acquisition module (100), for receiving the data information acquired by the information acquisition module (100) to perform arithmetic processing, and calculating a local minimum curvature, number of sampling points in neighborhoods, auxiliary feature points in the neighborhoods, an angle bisector vector and main direction, the database (202) being connected to each of the modules, and being used to store all received data information and provide deployment and supply services for the data processing center module (200); the input and output management unit (203) receiving information of each of the modules and outputting calculation result of the calculation unit (201).

A distribution module (300) being connected to the data processing center module (200), reading the calculation result of the calculation unit (201), controlling the main direction of the feature point to point to a concave edge of the feature point contour, and completing the main direction distribution to achieve precise matching.

Preferably, the information acquisition module 100 is a communication module based on the remote data acquisition platform, which integrates the communication chip and memory chip on a circuit board, so that it has the functions of sending and receiving information, communication and data transmission through the remote data acquisition platform. In addition, the computer, the single-chip computer, and the ARM are connected to the remote data acquisition platform through the RS232 serial port, and the information acquisition module 100 is controlled by the AI command to realize the data communication function.

Preferably, it should be noted that the data processing center module 200 is mainly divided into three levels, including a control layer, a computing layer, and a storage layer. The control layer is the command and control center of the data processing center module 200. It is composed of instruction register (IR), instruction decoder (ID) and operation controller (OC). The control layer can successively take out each instruction from the memory according to the user's pre-programmed program, put it in the instruction register (IR), analyze and determine it through the instruction decoder, and notify the operation controller (OC) to operate. Then send micro operation control signals to the corresponding components according to the determined timing. The operation layer is the core of the data processing center module 200 and can perform arithmetic operations (such as addition, subtraction, multiplication and division and their additional operations) and logic operations (such as shifting, logical testing, or comparison of two values). It is connected to the control layer and performs operation by receiving the control signal of the control layer. The storage layer is the database of the data processing center module 200, which can store data (data to be processed and processed).

It should be realized that the embodiments of the present invention can be realized or implemented by computer hardware, a combination of hardware and software, or by computer instructions stored in a non-transitory computer-readable memory. The method may be implemented in a computer program using standard programming techniques, including a non-transient computer-readable storage medium configured with a computer program, wherein the storage medium so configured causes the computer to operate in a specific and predefined manner—according to the methods and drawings described in the specific embodiments. Each program can be implemented in a high-level process or object-oriented programming language to communicate with the computer system. However, if necessary, the program can be implemented in assembly or machine language. In any case, the language can be a compiled or interpreted language. In addition, the program can be run on a programmed application specific integrated circuit for this purpose.

In addition, the operations of the processes described herein may be performed in any suitable order, unless otherwise indicated herein or otherwise clearly contradictory to the context. The processes (or variants and/or combinations thereof) described herein can be executed under the control of one or more computer systems configured with executable instructions, and can be used as code (for example, executable instructions, one or more computer programs, or one or more applications), implemented by hardware or a combination thereof. The computer program includes a plurality of instructions executable by one or more processors.

Further, the method can be implemented in any type of computing platform that is operably connected to a suitable computing platform, including but not limited to a personal computer, a mini computer, a main frame, a workstation, a network or a distributed computing environment, a separate or integrated computer platform, or communication with charged particle tools or other imaging devices, etc. Aspects of the present invention can be implemented by machine-readable codes stored on non-transitory storage media or devices, whether removable or integrated into computing platforms, such as hard disks, optical reading and/or writing storage media, RAM, ROM, etc., so that it can be read by a programmable computer. When the storage medium or device is read by a computer, it can be used to configure and operate the computer to perform the process described herein. In addition, the machine-readable code, or part thereof, can be transmitted through a wired or wireless network. When such media include instructions or programs that implement the steps described above in combination with a microprocessor or other data processors, the invention described herein includes these and other different types of non-transitory computer-readable storage media. When programming according to the methods and techniques described in the present invention, the present invention also includes the computer itself. A computer program can be applied to input data to perform the functions described herein, thereby converting the input data to generate output data that is stored in non-volatile memory. The output information can also be applied to one or more output devices, such as displays. In a preferred embodiment of the present invention, the converted data represents physical and tangible objects, including specific visual depictions of physical and tangible objects generated on the display.

As used in this application, the terms "component", "module", "system" and the like are intended to refer to a computer related entity, which may be hardware, firmware, a combination of hardware and software, software or running software. For example, a component may be, but is not limited to: a process running on a processor, a processor, an object, an executable file, an executing thread, a program, and/or a computer. As an example, both the application running on the computing device and the computing device may be components. One or more components may exist in an executing process and/or thread, and the components may be located in one computer and/or distributed between two or more computers. In addition, these components can execute from various computer-readable media having various data structures thereon. These components may communicate in a local and/or remote process manner, such as according to a signal having one or more data packets (for example, data from one component that interacts with another component in a local system, a distributed system, and/or interacts with other systems in a signal manner through a network such as the Internet).

It should be noted that the above embodiments are only used to illustrate the technical solutions of the present invention rather than limiting, although the present invention has been described in detail with reference to the preferred embodiments. Those of ordinary skill in the art should understand that modifications or equivalent replacements can be made to the technical solutions of the present invention without departing from the spirit and scope of the technical solutions of the present invention, which should all be covered by the scope of the claims of the present invention.

What is claimed is:

1. A heterogeneous image registration method comprising,
using a Canny edge detection operator to perform edge detection on collected images, in combination with a curvature scale space strategy to extract contour curved segments in an edge image;
implementing a feature point detection strategy based on global and local curvature detecting feature points in the contour curved segments, and obtaining the nearest minimum local curvature of the feature points pointing to starting and end points of the contour curved segments, respectively; wherein the detecting of the feature points comprising:
using the Canny edge detection operator to detect an edge binary image of the collected images, and extracting the contour curved segments in the edge image;
calculating curvature of each point in the contour curved segments, using a maximum curvature point on the contour curved segments as a candidate feature point, storing and detecting a nearest local minimum curvature point at both ends of each maximum point;
calculating an average curvature value of each candidate feature point in the neighborhoods of the contour curved segments;
setting a curvature multiple threshold, such that when the curvature of the candidate feature point is less than a product of the average curvature value multiplied by the curvature multiple threshold, the candidate feature point is eliminated;
when the curvature of the candidate feature point is greater than the product of multiplying the average curvature value by the curvature multiple threshold, calculating whether the candidate feature point is on a circular contour; if so, the candidate feature point is rejected; otherwise, the candidate feature point is retained;
calculating a positional relationship of the retained candidate feature point; if an angle between one of the feature points and two neighborhood feature points on the same contour is less than the curvature multiple threshold, defining the candidate feature point as the feature point; otherwise, the candidate feature point is eliminated; and
taking a first point and a last point of each unclosed contour as the feature points, and ending the extracting the feature points;
calculating a number of neighborhood sampling points and neighborhood auxiliary feature points of neighborhoods on both edges of each of the feature points according to the nearest minimum local curvature;
using the neighborhood auxiliary feature points and the feature points to form a feature triangle, and calculating an angle bisector vector and a main direction corresponding to the feature point in the feature triangle;
wherein the main direction points to a concave edge of a contour of the feature points to complete a main direction distribution.

2. The heterogeneous image registration method according to claim 1, wherein the nearest local minimum curvature point is defined comprising respectively detecting a nearest local minimum curvature point in the contour curved segments that is the nearest to the feature point and points to the starting point and the end point of the contour;
traversing from the first point to the last point of each contour; if the curvature of one of the feature points is less than the curvature of the two neighborhood feature points disposed on left and right sides of said feature point, the nearest local minimum curvature point is defined;
the feature point and both the two neighborhood feature points local minimum curvature disposed on the left and right sides of said feature point being respectively denoted as $P_f^j$, $P_{kL}^j$ and $P_{kR}^j$.

3. The heterogeneous image registration method according to claim 2, wherein calculating number of sampling points in the neighborhoods comprises, $$\lambda_L = f - kL$$

$$\lambda_R = kR - f$$

wherein $f \in [2, n]$, n: the number of feature points included in each contour; $\lambda_L$ and $\lambda_R$ are the numbers of the two neighborhood sampling points of the feature point, respectively.

4. The heterogeneous image registration method according to claim 3, wherein the neighborhood auxiliary feature points comprise:
Gaussian weighting abscissa and ordinate of all points between the $kL^{th}$ point and the $f^{th}$ point in the $j^{th}$ contour according to the followings:

$$P_{fL}^j = (x_{fL}^j, y_{fL}^j)$$
$$= G_{\sigma=min(\lambda_L,f)} \cdot [P_{f-min(\lambda_L-1,f-1)}^j; \ldots; P_{f-1}^j; P_f^j]$$

$$P_{fR}^j = (x_{fR}^j, y_{fR}^j)$$
$$= G_{\sigma=min(\lambda_R,n-f+1)} \cdot [P_{f+min(\lambda_R+1,n-f)}^j; \ldots; P_{f+1}^j; P_f^j]$$

$$G\sigma = \left[e^{-x^2/2\sigma^2}\big|_{x=0,1,2,\ldots,\sigma-1}\right] \Big/ \left(\sum_{x=0}^{\sigma-1} e^{-x^2/2\sigma^2}\right)$$

wherein $G_\sigma$: one-dimensional Gaussian kernel; $P_{kL}^j$ and $P_{kR}^j$: auxiliary feature points of the neighborhood; when f=1 or n, the one-dimensional Gaussian kernel is calculated as follows:

$$\begin{cases} f = 1 \\ P_{fL}^j = P_1^j \\ P_{fR}^j = (x_{fR}^j, y_{fR}^j) \\ \quad = G_{\sigma=min(\lambda_R,n)} \cdot [P_{min(\lambda_R,n)}^j; \ldots; P_2^j; P_1^j] \end{cases}$$

$$\begin{cases} f = n \\ P_{fR}^j = P_n^j \\ P_{fL}^j = (x_{fL}^j, y_{fL}^j) \\ \quad = G_{\sigma=min(\lambda_L,n)} \cdot [P_{n-min(\lambda_L,n-1)}^j; \ldots; P_{n-1}^j; P_n^j] \end{cases}$$

5. The heterogeneous image registration method according to claim 4, wherein said calculating the angle bisector vector comprises:

$$v_{fL}^j = (x_{fL}^j - x_f^j, y_{fL}^j - y_f^j)$$

$$v_{fR}^j = (x_{fR}^j - x_f^j, y_{fR}^j - y_f^j)$$

$$v_{fm}^j = (x_{fm}^j, y_{fm}^j)$$

$$= \min(\|v_{fL}^j\|_2, \|v_{fR}^j\|_2) \left(\frac{v_{fL}^j}{\|v_{fL}^j\|_2} + \frac{v_{fR}^j}{\|v_{fR}^j\|_2}\right)$$

wherein $P_f^j(x_f^j, y_f^j)$; $V_{fL}^j$ and $V_{fR}^j$ are the coordinates of the feature point $P_f^j$, respectively; $V_{fm}^j$: the angle bisector vector.

6. He heterogeneous image registration method according to claim 5, wherein said calculating the main direction comprises:

$$\phi(P_f^j) = \begin{cases} \tan^{-1}(y_{fm}^j/x_{fm}^j), & y_{fm}^j \geq 0 \cap x_{fm}^j \geq 0 \\ \tan^{-1}(y_{fm}^j/x_{fm}^j) + \pi, & x_{fm}^j < 0 \\ \tan^{-1}(y_{fm}^j/x_{fm}^j) + 2\pi, & y_{fm}^j < 0 \cap x_{fm}^j > 0 \end{cases}$$

wherein $\phi(P_f^j)$: the direction of the contour angle of feature point $P_f^j$ is the main direction of the feature point in the distribution.

7. The heterogeneous image registration method according to claim 1, wherein the edge detection on the collected images comprises:
Gaussian filtering on grayscale images to obtain filtered images;
calculating gradient matrix and direction matrix in the filtered images;
performing non-maximum value suppression on the gradient matrix to obtain non-maximum value suppressed images;
using dual-threshold strategy to detect and connect the edge contours of the non-maximum value suppressed images to obtain edge images.

8. The heterogeneous image registration method according to claim 7, wherein the extracting of the contour curved segments comprises:
starting from a first row and a first column of the edge images, iteratively traversing and searching in line units;
if a point is found as an edge point, the point is marked as a first contour point, and is set to 0;
determining whether there is the edge point in the region with an edge length of the contour point as 1, if so, adding the edge point to the contour region as a second contour point, and the second contour point is set to 0;
repeating the determining until there is no edge point in the region of one of the feature points, and defining the point where the determining stops as the end point of the contour;
each contour being a set of the edge points, and all the contours being integrated to form a set of contours, as follows:

$$S = \{\Gamma^j | \Gamma^j = \{P_1^j, P_2^j, \ldots P_n^j\}\}_{j=1}^{N_s}$$

wherein contour $\Gamma^j$: $j^{th}$ contour curved segment in set S; n: number of pixels contained in the contour $\Gamma^j$; $N_s$: the total number of contour curved segments in the set S.

* * * * *